(12) United States Patent
Liu (10) Patent No.: US 7,907,645 B1
(45) Date of Patent: Mar. 15, 2011

(54) HIGH ENERGY, ALL FIBER, MODE LOCKED FIBER LASER

(76) Inventor: Jian Liu, Sunnyvale, CA (US)

( * ) Notice: Subject to any disclaimer, the term of this patent is extended or adjusted under 35 U.S.C. 154(b) by 43 days.

(21) Appl. No.: 12/566,926

(22) Filed: Sep. 25, 2009

(51) Int. Cl.
*H01S 3/098* (2006.01)

(52) U.S. Cl. .................. 372/18; 372/6; 372/27; 372/94

(58) Field of Classification Search ................ 372/6, 18, 372/27, 94
See application file for complete search history.

(56) References Cited

U.S. PATENT DOCUMENTS

| | | | | |
|---|---|---|---|---|
| 5,828,682 | A * | 10/1998 | Moores | 372/26 |
| H1813 | H * | 11/1999 | Kersey | 372/94 |
| 7,477,666 | B2 * | 1/2009 | Liu | 372/6 |
| 2005/0201432 | A1 * | 9/2005 | Uehara et al. | 372/30 |
| 2006/0182153 | A1 * | 8/2006 | Liu | 372/6 |

OTHER PUBLICATIONS

Jian Liu, High Energy All Fiber Mode Locked Fiber Laser, currently unpublished patent application filed Mar. 9, 2009, U.S. Appl. No. 12/400,780 / Confirmation No. 4642

B. Ortaç, M. Baumgartl, O. Schmidt, J. Limpert, A. Hideur, I. Sagnes, A. Garnache, and A. Tünnermann, "µJ-Level Femtosecond and Picosecond Fiber Oscillators," in Advanced Solid-State Photonics, OSA Technical Digest Series (CD) (Optical Society of America, 2009), paper MB15.

* cited by examiner

*Primary Examiner* — Tod T Van Roy
(74) *Attorney, Agent, or Firm* — John M. Taboada (57) ABSTRACT

Methods and systems for generating high energy, mode locked, femtosecond and picosecond laser pulses are disclosed, including generating electromagnetic radiation from a pump laser; coupling the electromagnetic radiation to a rare Earth doped fiber using a pump/signal coupler; coupling the output from the rare Earth doped fiber to a first fiber; coupling a bandpass filter to the first fiber output and to a second fiber; coupling a first in-line polarization controller to the second fiber output and an in-line polarization beam splitter comprising a non-polarization maintaining fiber output and a polarization maintaining fiber output configured to emit an output laser pulse; coupling a polarization insensitive isolator to the non-polarization maintaining fiber output of the in-line polarization beam splitter and to a second in-line polarization controller; coupling a third fiber output to the second in-line polarization controller and to the pump/signal coupler. Other embodiments are described and claimed.

40 Claims, 5 Drawing Sheets

HIGH ENERGY, ALL FIBER, MODE LOCKED FIBER LASER

I. BACKGROUND

The invention relates generally to the field of using an all fiber ring cavity laser for generating high energy, mode locked femtosecond and picosecond pulses.

II. SUMMARY

In one respect, disclosed is an all fiber, mode locked fiber laser comprising: a pump laser; and a ring cavity comprising: a pump/signal coupler comprising an input and an output, wherein the pump laser is coupled to the input of the pump/signal coupler; a cladding pumped or double cladding fiber comprising a doped gain medium and an input and an output, wherein the input of the doped fiber is coupled to the output of the pump/signal coupler; a first fiber comprising an input and an output, wherein the input of the first fiber is coupled to the output of the doped fiber; a bandpass filter comprising an input and an output, wherein the input of the bandpass filter is coupled to the output of the first fiber; a second fiber comprising an input and an output, wherein the input of the second fiber is coupled to the output of the bandpass filter; a first in-line polarization controller comprising an input and an output, wherein the input of the first in-line polarization controller is coupled to the output of the second fiber; an in-line polarization beam splitter comprising an input, a polarization maintaining output configured to emit a laser pulse out of the ring cavity, and a non-polarization maintaining fiber output, wherein the input of the in-line polarization beam splitter is coupled to the output of the first in-line polarization controller; a polarization insensitive isolator comprising an input and an output, wherein the input of the polarization insensitive isolator is coupled to the non-polarization maintaining fiber output of the in-line polarization beam splitter; a second in-line polarization controller comprising an input and an output, wherein the input of the second in-line polarization controller is coupled to the output of the polarization insensitive isolator; a third fiber comprising an input and an output, wherein the input of the third fiber is coupled to the output of the second in-line polarization controller and the output of the third fiber is coupled to the input of the pump/signal coupler; and wherein the ring cavity is configured to have no components at anomalous dispersion.

In another respect, disclosed is a method for generating mode locked, femtosecond and picosecond laser pulses, the method comprising: generating electromagnetic radiation from a pump laser; and coupling the pump laser electromagnetic radiation to a ring cavity comprising: a pump/signal coupler comprising an input and an output, wherein the pump laser is coupled to the input of the pump/signal coupler; a cladding pumped or double cladding fiber comprising a doped gain medium and an input and an output, wherein the input of the doped fiber is coupled to the output of the pump/signal coupler; a first fiber comprising an input and an output, wherein the input of the first fiber is coupled to the output of the doped fiber; a bandpass filter comprising an input and an output, wherein the input of the bandpass filter is coupled to the output of the first fiber; a second fiber comprising an input and an output, wherein the input of the second fiber is coupled to the output of the bandpass filter; a first in-line polarization controller comprising an input and an output, wherein the input of the first in-line polarization controller is coupled to the output of the second fiber; an in-line polarization beam splitter comprising an input, a polarization maintaining output configured to emit a laser pulse out of the ring cavity, and a non-polarization maintaining fiber output, wherein the input of the in-line polarization beam splitter is coupled to the output of the first in-line polarization controller; a polarization insensitive isolator comprising an input and an output, wherein the input of the polarization insensitive isolator is coupled to the non-polarization maintaining fiber output of the in-line polarization beam splitter; a second in-line polarization controller comprising an input and an output, wherein the input of the second in-line polarization controller is coupled to the output of the polarization insensitive isolator; a third fiber comprising an input and an output, wherein the input of the third fiber is coupled to the output of the second in-line polarization controller and the output of the third fiber is coupled to the input of the pump/signal coupler; and wherein the ring cavity is configured to have no components at anomalous dispersion.

Numerous additional embodiments are also possible.

III. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, an all fiber, mode locked laser can generate mode locked femtosecond (fs) and picoseconds (ps) pulses by utilizing components for polarization and spectral shaping. By varying the fiber cavity length, the repetition rate can vary from 100 MHz to 10 kHz and by also adjusting the position of the output coupler, the output pulse width can range from 100 femtoseconds to 100 nanoseconds. The output pulse can be compressed from 10 fs to 100 ps.

Figure 1:
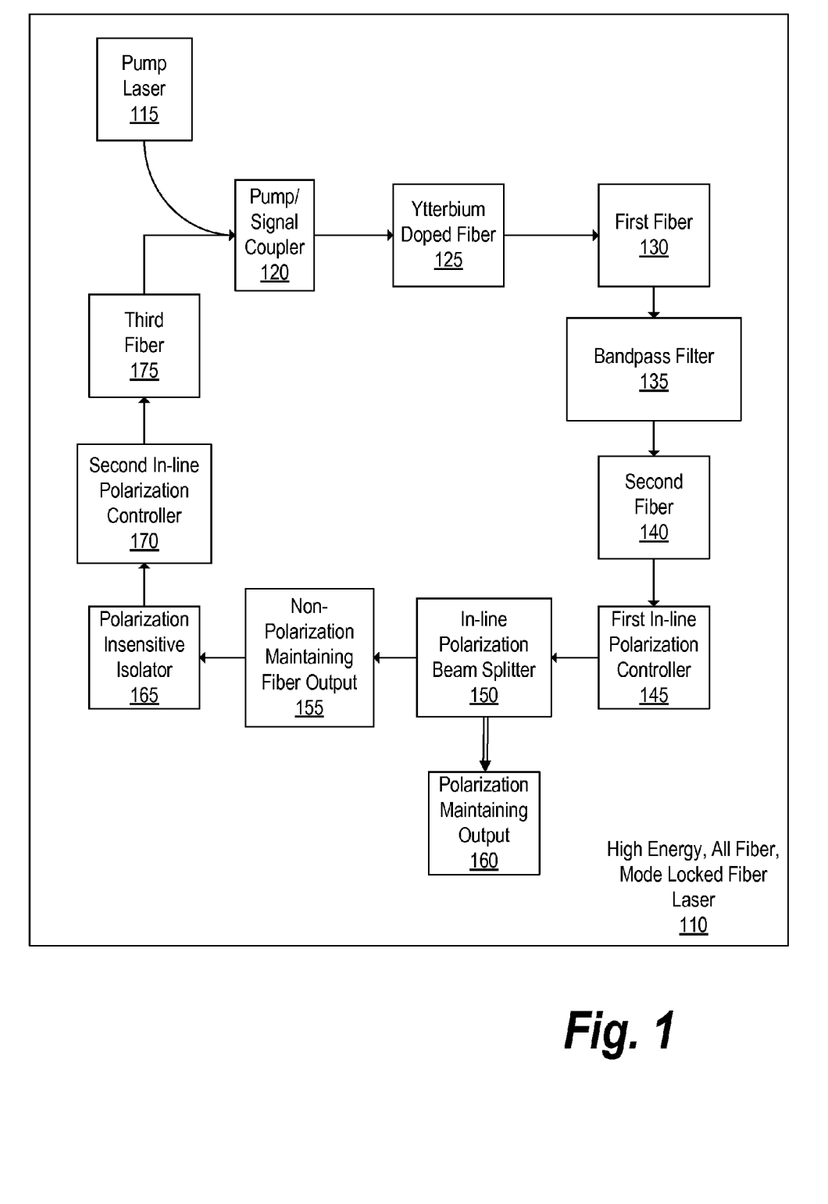
FIG. 1 is a block diagram illustrating a nonlinear polarization, pulse shaping and spectral shaping, all fiber, mode locked fiber laser at one micron, in accordance with some embodiments.

FIG. 1 is a block diagram illustrating a nonlinear polarization, pulse shaping and spectral shaping, all fiber, mode locked fiber laser at one micron, in accordance with some embodiments.

In some embodiments, a nonlinear polarization, pulse shaping and spectral shaping, all fiber, mode locked fiber laser, as shown in block 110, comprises a ring cavity laser comprising a pump laser 115 coupled with a pump/signal coupler 120. The pump laser 115 may be any high power laser diode emitting electromagnetic radiation between 905 nm to 985 nm. In this embodiment a 976 nm diode laser was selected as the pump laser in matching with the highest absorption peak of Ytterbium (Yb) gain medium. The pump/signal coupler 120 may be a WDM coupler such as either a 980/1060 or a 980/1030 coupler and can be either a fiber bundled combiner or coupler type. The pump/signal coupler 120 couples the laser pulses from the pump laser 115 into the gain medium of a rare Earth doped fiber. Depending on the desired lasing wavelength, dopants such as Ytterbium, Erbium (Er), and Thulium (Tm) and co-dopants such Erbium/Ytterbium may be used as the gain medium in the fiber amplifier component of the ring cavity laser. In this embodiment, a cladding pumped or double cladding Ytterbium doped fiber 125, having a high doping concentration ranging between 10,000 ppm to 2,000,000 ppm, was used to amplify the laser pulses. For the Ytterbium doped fiber with double cladding, the core can be single mode (SM), large mode area (LMA), and/or multi-mode (MM) fiber. The amplified laser pulses from the Ytterbium doped fiber 125 output are coupled into a first fiber 130. The first fiber 130 can be single mode fiber, such as HI 1060 fiber or SM 25 fiber, LMA fiber, and/or MM fiber. The output of the first single mode fiber 130 is coupled into a bandpass filter 135 to select the wavelength and stabilize the mode locking of the ring cavity. The bandpass filter 135 has a bandwidth between 1 nm to 100 nm. The bandpass filter 135 is then coupled to a second fiber 140. The second fiber 140 can be single mode fiber, such as HI 1060 fiber or SM 25 fiber, LMA fiber, and/or MM fiber. The second fiber 140 is then coupled to a first fiber based, in-line polarization controller 145. The output of the first in-line polarization controller 145 is then coupled with an in-line polarization beam splitter 150 having a non-polarization maintaining fiber output 155 and a polarization maintaining output 160. When the laser pulse passes through the in-line polarization beam splitter 150, only the highest intensity that is aligned with the in-line polarization beam splitter 150 will pass and the lower intensity part of the laser pulse will be filtered, thereby shaping the laser pulse and working like a saturable absorber to induce mode locking. The in-line polarization beam splitter 150 may either split the laser beam using a polarization splitter cube or a birefringence crystal. In both cases, the laser beam is split into a non-polarization maintaining fiber 155 that is coupled back into the ring of the cavity to insure a stable mode-locking mechanism and a polarization maintaining fiber output 160. Both the polarization maintaining fiber output 160 and non-polarization maintaining fiber output 155 can be single mode fiber, such as HI 1060 fiber or SM 25 fiber, LMA fiber, and/or MM fiber. One alternative is to output the laser pulses in free space without the output fiber. The non-polarization maintaining fiber output 155 is then coupled to a polarization insensitive isolator 165. The polarization insensitive isolator 165 is used in the ring cavity to insure unidirectional propagation. A second fiber based, in-line polarization controller 170 is then connected to the polarization insensitive isolator 165. The output of the second in-line polarization controller 170 is then coupled into a third fiber 175. The third fiber 175 can be single mode fiber, such as HI 1060 fiber or SM 25 fiber, LMA fiber, and/or MM fiber. The output of the third single mode fiber 175 is then coupled back into the pump/signal coupler 120, thus completing the all fiber ring cavity. The fibers used in the components of the ring cavity such as the pump coupler 120, the bandpass filter 135, the first and second in-line polarization controller 145 and 170, the polarization insensitive isolator 165, and the in-line polarization beam splitter 150 can be single mode fiber, such as HI 1060 fiber or SM 25 fiber, LMA fiber, and/or MM fiber. The output power levels from the polarization maintaining fiber output 160 can be changed by adjusting the two in-line polarization controllers 145 and 170 and the in-line polarization beam splitter 150.

By changing the gain medium from Yb fiber to Er doped or Er/Yb co-doped fiber, or Tm doped fiber, the invention can work for other wavelengths in 1550 nm region (Er or Er/Yb) and 1950 nm region (Tm).

Figure 2:
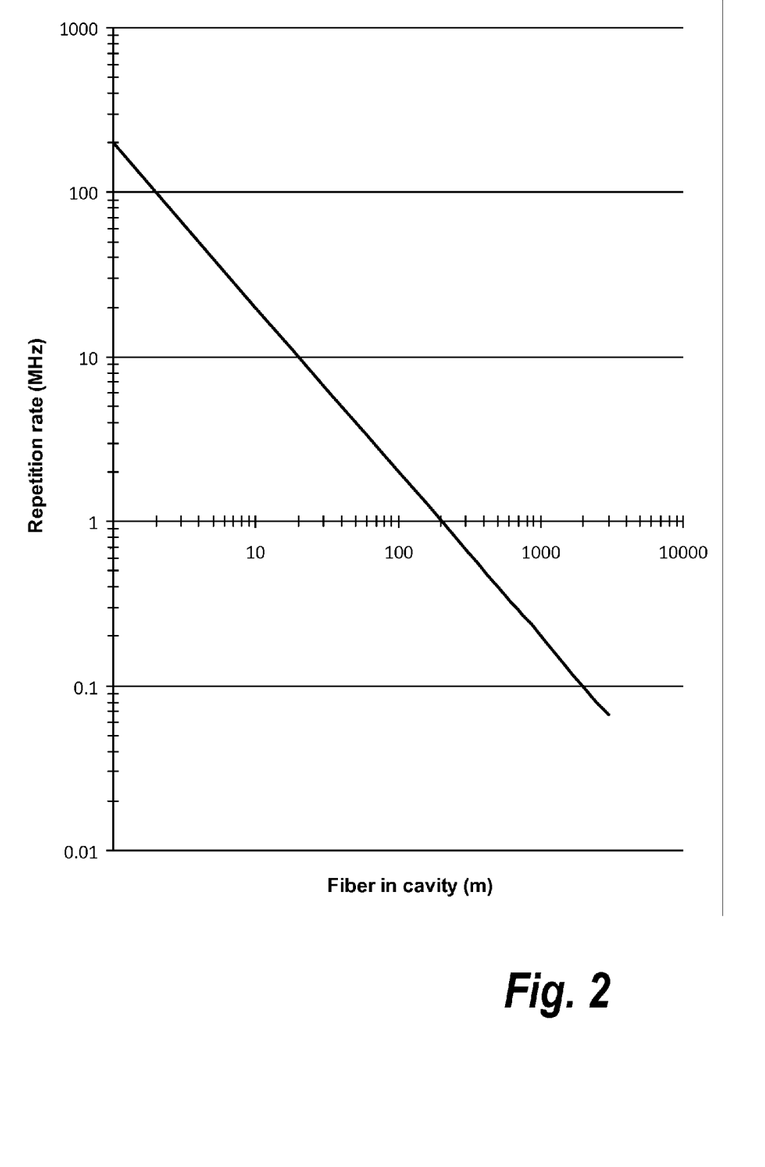
FIG. 2 is a graph showing the repetition rate as a function of fiber length in a ring laser cavity, in accordance with some embodiments.

FIG. 2 is a graph showing the repetition rate as a function of fiber length in a ring laser cavity, in accordance with some embodiments.

In some embodiments, the pulse repetition rate can be lowered by using a longer fiber cavity length. A 20 m fiber in the cavity will result in a pulse repetition rate of 10 MHz; whereas a 2 km fiber cavity will result in a pulse repetition rate of 100 kHz. Thus by using a longer fiber in the cavity, the pulse repetition rate in the laser can be lowered.

Figure 3:
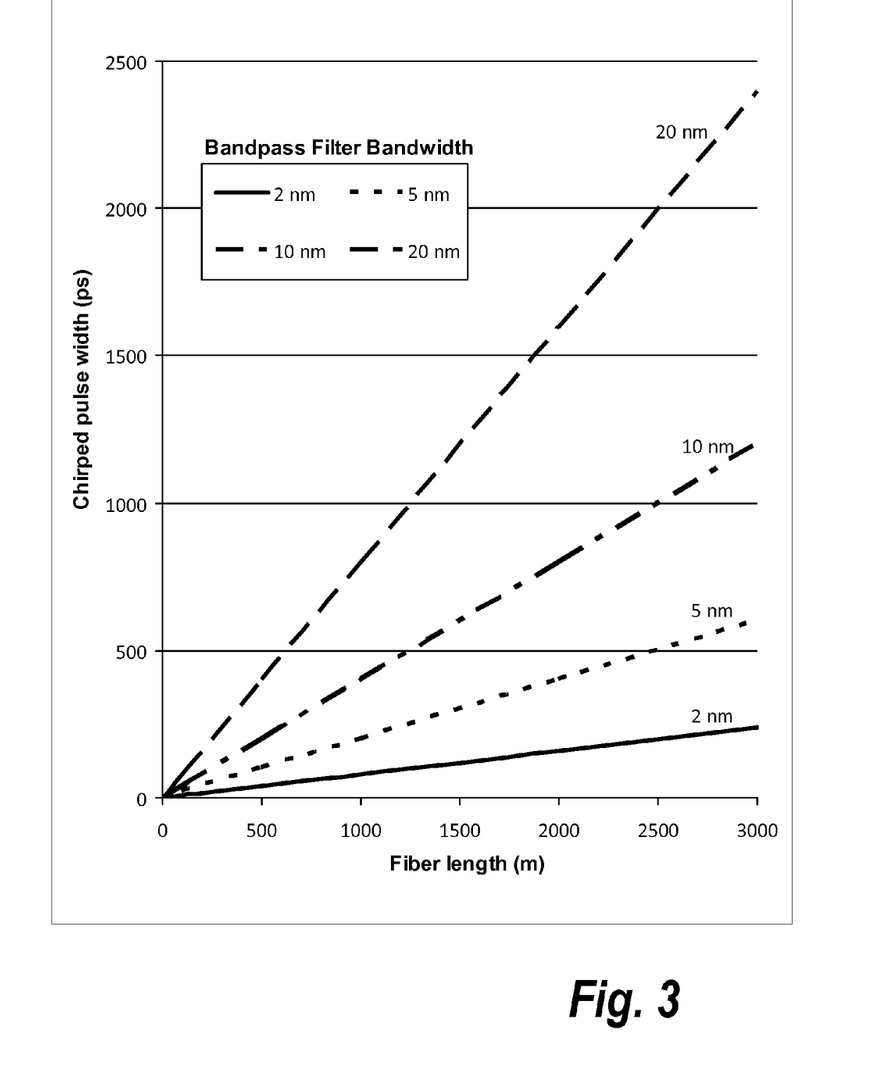
FIG. 3 is a graph showing the chirped pulse width as a function of the fiber cavity length and the bandpass filter bandwidth, in accordance with some embodiments.

FIG. 3 is a graph showing the chirped pulse width as a function of the fiber cavity length and the bandpass filter bandwidth, in accordance with some embodiments.

In some embodiments, at a given pulse repetition rate, changing the bandpass filter bandwidth can achieve different pulse operation with various pulse bandwidth and pulse width in combination with fiber position. FIG. 3 shows the dependence of the chirped pulse width as a function of the fiber length in the cavity of the laser and the bandwidth of the bandpass filter of the laser, assuming a cavity with only the second fiber 140 and without the first fiber 130 and third fiber 175. The chirped pulse width increases with increasing cavity fiber length and broader bandwidth of bandpass filter.

Figure 4:
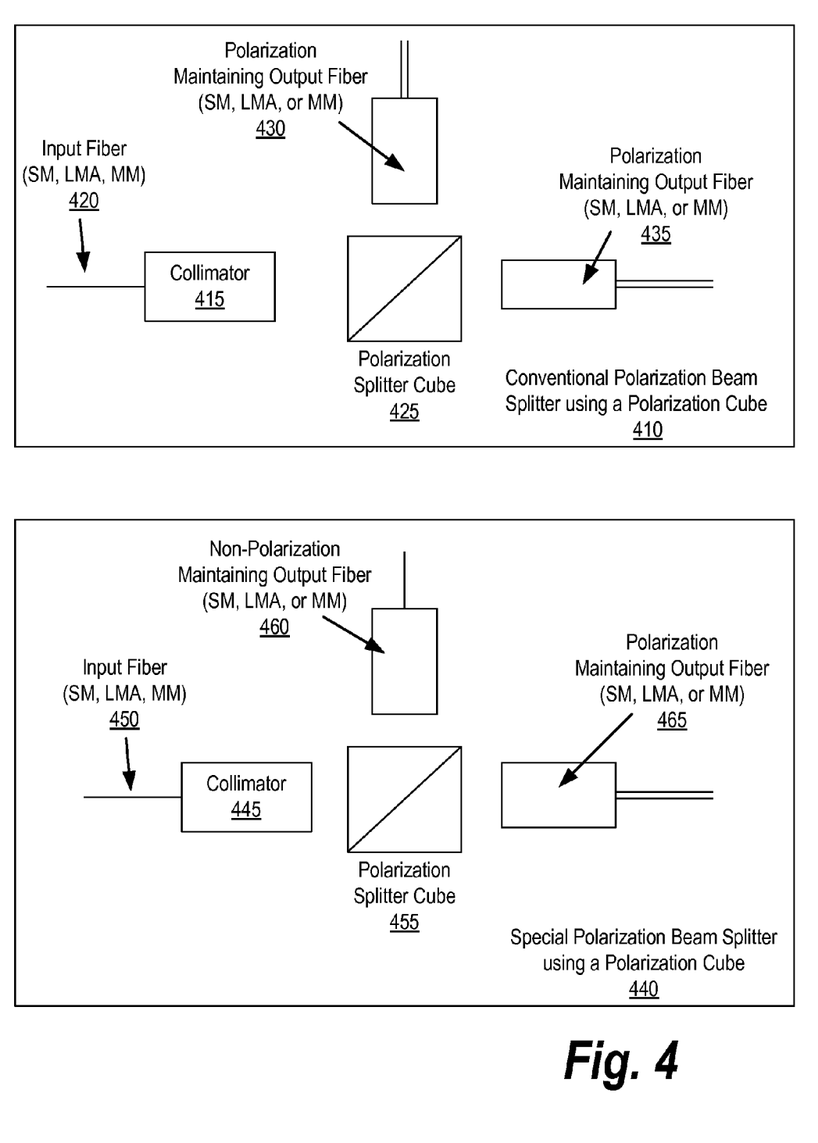
FIG. 4 is a schematic showing the details of the polarization beam splitter using a polarization cube, in accordance with some embodiments.

FIG. 4 is a schematic showing the details of the polarization beam splitter using a polarization cube, in accordance with some embodiments.

In some embodiments, the polarization beam splitter is of a special design. In conventional polarization beam splitters 410, the collimator 415 from the input fiber comprising SM, LMA, and/or MM fiber 420 hits a polarization splitter cube 425 and then splits the beam into two polarization maintaining output fibers comprising SM, LMA, and/or MM fiber, 430 and 435. In the special design for the polarization beam splitter 440, the collimator 445 from the input fiber comprising SM, LMA, and/or MM fiber 450 hits a polarization splitter cube 455 and then splits the beam into a non-polarization maintaining output fiber comprising SM, LMA, and/or MM fiber 460 and a polarization maintaining fiber comprising SM, LMA, and/or MM fiber 465. The non-polarization maintaining output fiber 460 is coupled back into the ring cavity of the all fiber, mode locked fiber laser. This insures a stable mode locking mechanism. The polarization maintaining output fiber 465 is used as the output from the high energy, all fiber, mode locked fiber laser.

Figure 5:
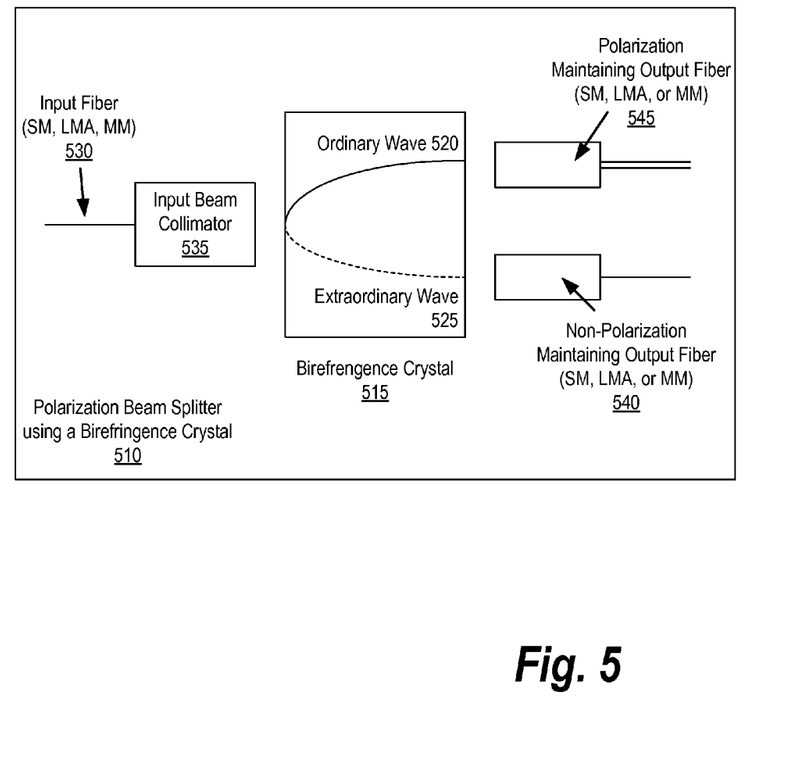
FIG. 5 is a schematic showing the details of the polarization beam splitter using a birefringence crystal, in accordance with some embodiments.

FIG. 5 is a schematic showing the details of the polarization beam splitter using a birefringence crystal, in accordance with some embodiments.

In some embodiments, polarization beam splitter 510 uses the double refraction of a birefringence crystal 515 to generate an ordinary wave 520 and an extraordinary wave 525 from an input fiber comprising SM, LMA, and/or MM fiber 530 and collimator 535. The split beams are coupled into two output fibers, one non-polarization maintaining fiber comprising SM, LMA, and/or MM fiber 540, and the other polarization maintaining fiber comprising SM, LMA, and/or MM fiber 545. As in the output fibers from the polarization beam splitter using a polarization cube, the non-polarization maintaining fiber 540 is coupled into the ring cavity and the polarization maintaining fiber 545 is used as the output from the high energy, all fiber, mode locked fiber laser.

The just described high energy, all fiber, mode locked fiber laser is self start, and operates at all normal dispersion and without any anomalous dispersion (B"<0) fibers or components to achieve stable mode locking pulses having energy between 100 pJ to 1 mJ and a with a pulse repetition rate between 10 kHz to 100 MHz. The mode lock mechanism is created by both polarization shaping, due to self phase modulation induced polarization change, and spectral shaping resulting from the bandwidth of the band pass filter. By adjusting the position and lengths of the three fiber segments, the chirped output width can vary from 1 to 1,000,000 times the dechirped pulse width. The output pulse width can be chirped from 100 fs to 100 ns and the chirped output pulses can be dechirped from 10 fs to 100 ps. The total fiber length in the cavity can range from 1 m to 20,000 m. The output spectrum bandwidth of the laser ranges from 0.5 nm to 150 nm and has a center lasing wavelength, when using a Ytterbium gain medium, between 1010 nm to 1150 nm. The output from the laser may either be polarized or non-polarized and may either be coupled to a fiber or be free space.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An all fiber, mode locked fiber laser comprising:
a pump laser; and
a ring cavity comprising:
a pump/signal coupler comprising an input and an output, wherein the pump laser is coupled to the input of the pump/signal coupler;
a cladding pumped or double cladding fiber comprising a doped gain medium and an input and an output, wherein the input of the doped fiber is coupled to the output of the pump/signal coupler;
a first fiber comprising an input and an output, wherein the input of the first fiber is coupled to the output of the doped fiber;
a bandpass filter comprising an input and an output, wherein the input of the bandpass filter is coupled to the output of the first fiber;
a second fiber comprising an input and an output, wherein the input of the second fiber is coupled to the output of the bandpass filter;
a first in-line polarization controller comprising an input and an output, wherein the input of the first in-line polarization controller is coupled to the output of the second fiber;
an in-line polarization beam splitter comprising an input, a polarization maintaining output configured to emit a laser pulse out of the ring cavity, and a non-polarization maintaining fiber output, wherein the input of the in-line polarization beam splitter is coupled to the output of the first in-line polarization controller;
a polarization insensitive isolator comprising an input and an output, wherein the input of the polarization insensitive isolator is coupled to the non-polarization maintaining fiber output of the in-line polarization beam splitter;
a second in-line polarization controller comprising an input and an output, wherein the input of the second in-line polarization controller is coupled to the output of the polarization insensitive isolator;
a third fiber comprising an input and an output, wherein the input of the third fiber is coupled to the output of the second in-line polarization controller and the output of the third fiber is coupled to the input of the pump/signal coupler; and
wherein the ring cavity is configured to have no components at anomalous dispersion.

2. The all fiber, mode locked fiber laser of claim 1, wherein the pump laser has a wavelength between 905 nm to 985 nm.

3. The all fiber, mode locked fiber laser of claim 1, wherein the laser pulse has an energy between 100 pJ to 1 mJ.

4. The all fiber, mode locked fiber laser of claim 1, wherein the doped gain medium is at least one of: Ytterbium, Erbium, and Thulium.

5. The all fiber, mode locked fiber laser of claim 4, wherein the laser pulse has a center lasing wavelength ranging from 1010 nm to 1150 nm.

6. The all fiber, mode locked fiber laser of claim 4, wherein the laser pulse has a center lasing wavelength ranging of 1500 nm to 1650 nm.

7. The all fiber, mode locked fiber laser of claim 4, wherein the laser pulse has a center lasing wavelength ranging of 1800 nm to 2200 nm.

8. The all fiber, mode locked fiber laser of claim 1, wherein the laser pulse has a pulse repetition rate ranging from 10 kHz to 100 MHz.

9. The all fiber, mode locked fiber laser of claim 1, wherein the laser pulse has a spectrum bandwidth ranging from 0.5 nm to 150 nm.

10. The all fiber, mode locked fiber laser of claim 1, wherein the laser chirped pulse has a pulse width ranging from 100 fs to 100 ns and the chirped output pulses can be de-chirped from 10 fs to 100 ps.

11. The all fiber, mode locked fiber laser of claim 1, wherein the total length of the first fiber, the second fiber, and the third fiber ranges from 1 m to 20,000 m.

12. The all fiber, mode locked fiber laser of claim 1, wherein the bandpass filter has a bandwidth ranging from 1 nm to 100 nm.

13. The all fiber, mode locked fiber laser of claim 1, wherein the first fiber is at least one of: single mode fiber, large mode area fiber, and multi-mode fiber.

14. The all fiber, mode locked fiber laser of claim 1, wherein the second fiber is at least one of: single mode fiber, large mode area fiber, and multi-mode fiber.

15. The all fiber, mode locked fiber laser of claim 1, wherein the third fiber is at least one of: single mode fiber, large mode area fiber, and multi-mode fiber.

16. The all fiber, mode locked fiber laser of claim 1, wherein the non-polarization maintaining fiber of the in-line polarization beam splitter is at least one of: single mode fiber, large mode area fiber, and multi-mode fiber.

17. The all fiber, mode locked fiber laser of claim 1, wherein the polarization maintaining fiber of the in-line polarization beam splitter is at least one of: single mode fiber, large mode area fiber, and multi-mode fiber.

18. The all fiber, mode locked fiber laser of claim 4, wherein the Ytterbium doped fiber has a doping concentration ranging from 10,000 ppm to 2,000,000 ppm and wherein the Ytterbium doped fiber is at least one of single mode fiber, large mode area fiber, and multi-mode fiber.

19. The all fiber, mode locked fiber laser of claim 1, wherein the pump/signal coupler is a 980/1060 coupler or a 980/1030 coupler.

20. The all fiber, mode locked fiber laser of claim 1, wherein the in-line polarization beam splitter is a polarization splitter cube or a birefringence crystal.

21. A method for generating mode locked, femtosecond and picosecond laser pulses, the method comprising:
generating electromagnetic radiation from a pump laser; and
coupling the pump laser electromagnetic radiation to a ring cavity comprising:
a pump/signal coupler comprising an input and an output, wherein the pump laser is coupled to the input of the pump/signal coupler;
a cladding pumped or double cladding fiber comprising a doped gain medium and an input and an output, wherein the input of the doped fiber is coupled to the output of the pump/signal coupler;
a first fiber comprising an input and an output, wherein the input of the first fiber is coupled to the output of the doped fiber;
a bandpass filter comprising an input and an output, wherein the input of the bandpass filter is coupled to the output of the first fiber;
a second fiber comprising an input and an output, wherein the input of the second fiber is coupled to the output of the bandpass filter;
a first in-line polarization controller comprising an input and an output, wherein the input of the first in-line polarization controller is coupled to the output of the second fiber;
an in-line polarization beam splitter comprising an input, a polarization maintaining output configured to emit a laser pulse out of the ring cavity, and a non-polarization maintaining fiber output, wherein the input of the in-line polarization beam splitter is coupled to the output of the first in-line polarization controller;
a polarization insensitive isolator comprising an input and an output, wherein the input of the polarization insensitive isolator is coupled to the non-polarization maintaining fiber output of the in-line polarization beam splitter;
a second in-line polarization controller comprising an input and an output, wherein the input of the second in-line polarization controller is coupled to the output of the polarization insensitive isolator;
a third fiber comprising an input and an output, wherein the input of the third fiber is coupled to the output of the second in-line polarization controller and the output of the third fiber is coupled to the input of the pump/signal coupler; and
wherein the ring cavity is configured to have no components at anomalous dispersion.

22. The method of claim 21, wherein the electromagnetic radiation from the pump laser has a wavelength between 905 nm to 985 nm.

23. The method of claim 21, wherein the laser pulse emitted from the ring cavity has an energy between 100 pJ to 1 mJ.

24. The method of claim 21, wherein the doped gain medium is at least one of: Ytterbium, Erbium, and Thulium.

25. The method of claim 24, wherein the laser pulse has a center lasing wavelength ranging from 1010 nm to 1150 nm.

26. The method of claim 24, wherein the laser pulse has a center lasing wavelength ranging of 1500 nm to 1650 nm.

27. The method of claim 24, wherein the laser pulse has a center lasing wavelength ranging of 1800 nm to 2200 nm.

28. The method of claim 21, wherein the laser pulse emitted from the ring cavity has a pulse repetition rate ranging from 10 kHz to 100 MHz.

29. The method of claim 21, wherein the laser pulse emitted from the ring cavity has a spectrum bandwidth ranging from 0.5 nm to 150 nm.

30. The method of claim 21, wherein the laser chirped pulse emitted from the ring cavity has a pulse width ranging from 100 fs to 100 ns and the chirped output pulses can be de-chirped from 10 fs to 100 ps.

31. The method of claim 21, wherein the total length of the first fiber, the second fiber, and the third fiber ranges from 1 m to 20,000 m.

32. The method of claim 21, wherein the bandpass filter has a bandwidth ranging from 1 nm to 100 nm.

33. The method of claim 21, wherein the first fiber is at least one of: single mode fiber, large mode area fiber, and multi-mode fiber.

34. The method of claim 21, wherein the second fiber is at least one of: single mode fiber, large mode area fiber, and multi-mode fiber.

35. The method of claim 21, wherein the third fiber is at least one of: single mode fiber, large mode area fiber, and multi-mode fiber.

36. The method of claim 21, wherein the non-polarization maintaining fiber of the in-line polarization beam splitter is at least one of: single mode fiber, large mode area fiber, and multi-mode fiber.

37. The method of claim 21, wherein the polarization maintaining fiber of the in-line polarization beam splitter is at least one of: single mode fiber, large mode area fiber, and multi-mode fiber.

38. The method of claim 24, wherein the Ytterbium doped fiber has a doping concentration ranging from 10,000 ppm to 2,000,000 ppm and wherein the Ytterbium doped fiber is at least one of single mode fiber, large mode area fiber, and multi-mode fiber.

39. The method of claim 21, wherein the pump/signal coupler is a 980/1060 coupler or a 980/1030 coupler.

40. The method of claim 21, wherein the in-line polarization beam splitter is a polarization splitter cube or a birefringence crystal.

* * * * *